UNITED STATES PATENT OFFICE.

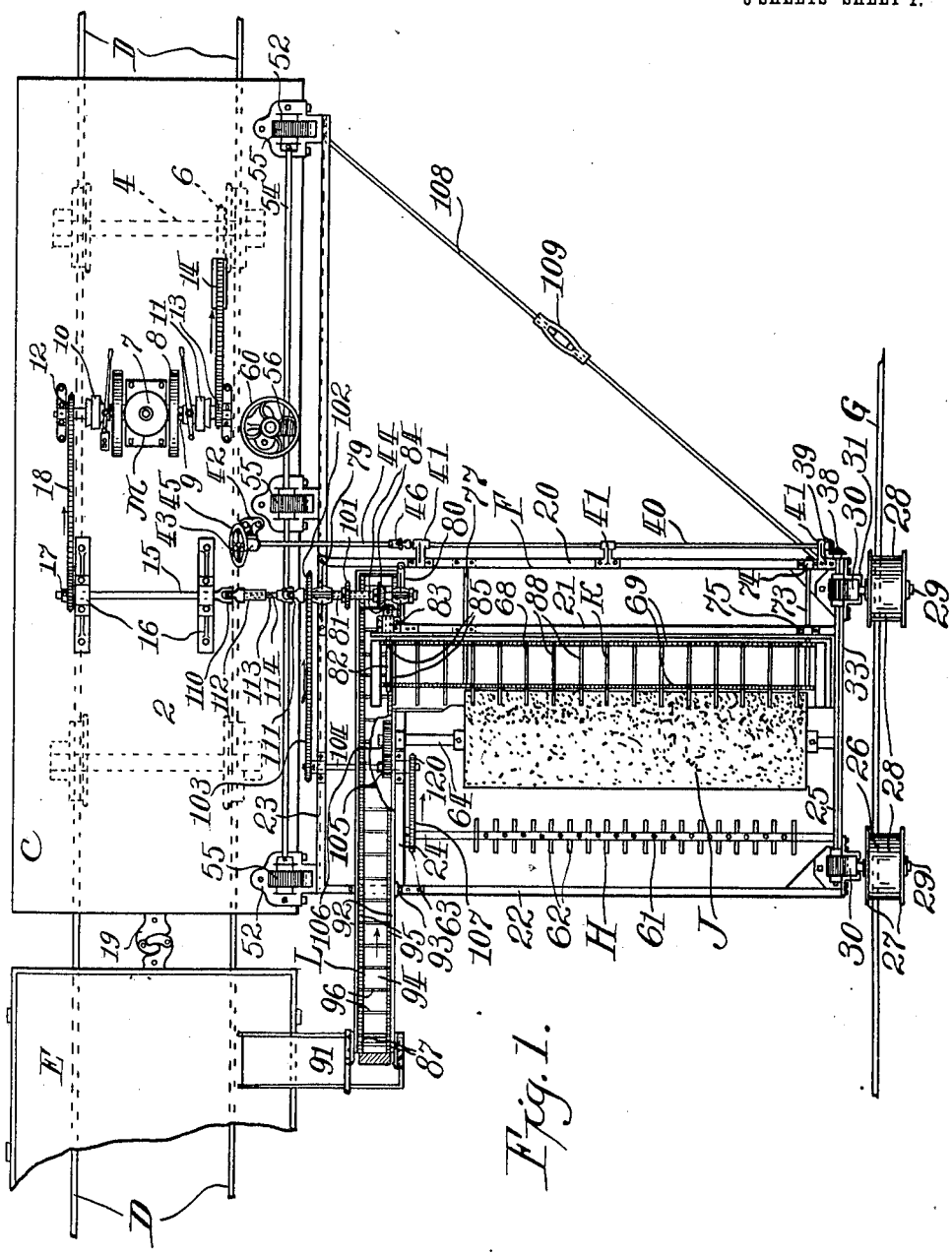

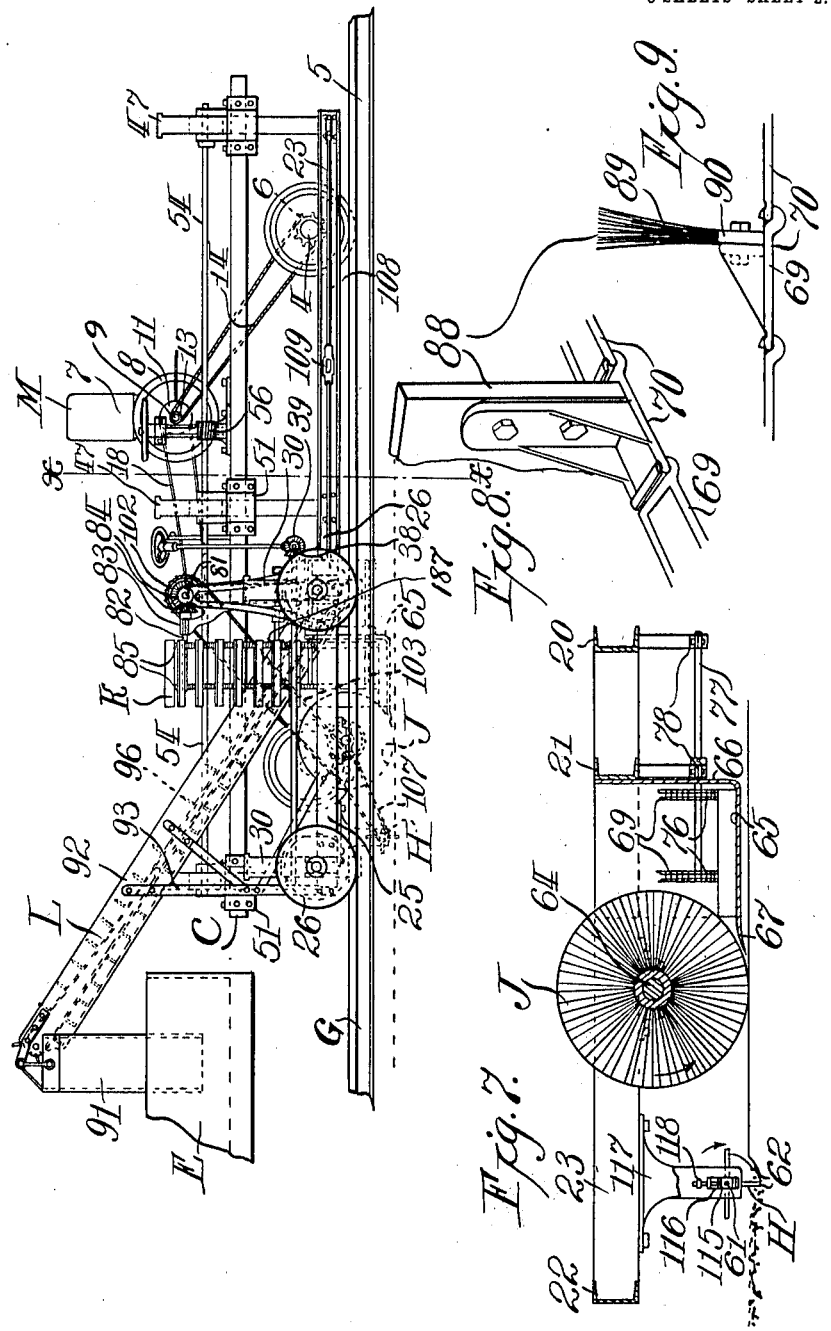

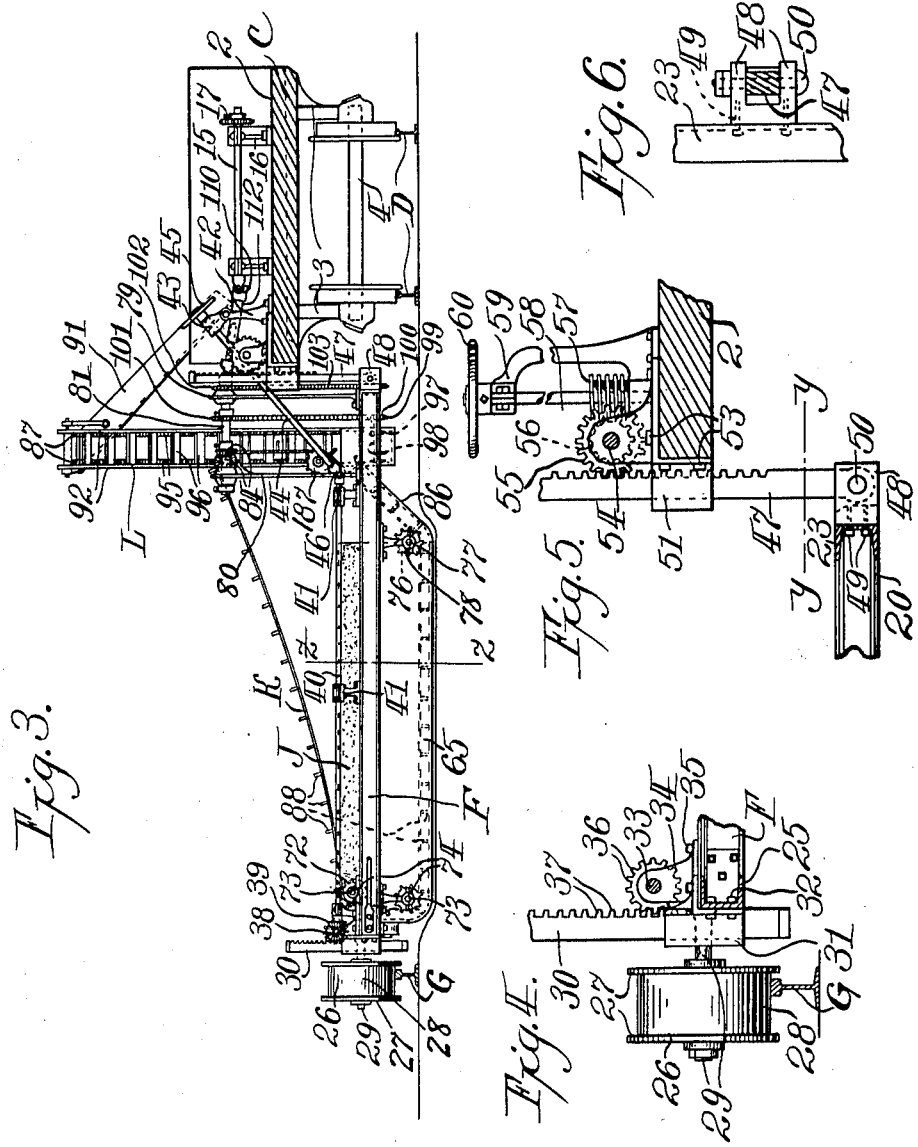

ANDREW S. CAIRNCROSS, OF ST. PAUL, MINNESOTA.

PEAT-MACHINE.

1,019,946.  Specification of Letters Patent.  Patented Mar. 12, 1912.

Application filed May 9, 1911. Serial No. 626,077.

*To all whom it may concern:*

Be it known that I, ANDREW S. CAIRNCROSS, a citizen of the United States, residing at St. Paul, in the county of Ramsey and State of Minnesota, have invented a new and useful Improvement in Peat-Machines, of which the following is a specification.

My invention relates to improvements in peat machines and its object is to provide a machine which in one operation will gather loose peat from the surface of the ground and discharge it into a convenient receptacle, and at the same time cut or pulverize the cleared surface to a convenient depth to permit its drying before being gathered. I accomplish these results in a self-propelling car which carries with it a pulverizer and elevator which deliver the pulverized peat into a car which may be conveniently attached to the self-propelled car. A great deal of difficulty has been experienced in gathering moist peat from the ground and subsequently sun-drying it, and when the peat has been dried on the ground it has been found difficult to gather it in an efficient and economical manner for transportation to a manufacturing plant. The combination of pulverizer, collector and elevator which I use is especially adapted to overcome these difficulties.

In the drawings with which I have illustrated my device and which form part of this specification Figure 1 is a plan of my peat machine; Fig. 2 is an elevation; Fig. 3 is a section on the line X—X Fig. 2; Figs. 4 and 5 are details of the attachment of the operating frame taken from Fig. 3; Fig. 6 is a section on the line Y—Y, Fig. 5; Fig. 7 is a section on the line Z—Z, Fig. 3; Fig. 8 is a detail of the chain conveyer, and Fig. 9 is an alternative form of the conveyer.

In the above drawings I have shown a self-propelling car C operating on a track D and drawing a hopper car E. At the side of the car C is an operating frame F supported on the car and on an additional track G lying parallel with the track D. In the frame F is journaled a rotary agitator or pulverizer H, a rotary brush J and conveyers K and L transmitting the material gathered by the brush to the car E. A suitable engine M is mounted on the car C and connected with the car and with the agitator, brush and elevator on the frame F. The car C is formed with a platform 2 mounted on a truck frame 3 in which is journaled a truck 4 of ordinary construction and rolling on rails of the track D. On one of the axles of the trucks 4 is mounted a sprocket wheel 6.

The engine M has a cylinder 7 and fly wheels 8 and operates the drive shaft 9 in which are interposed friction clutches 10 and 11 driving the sprocket wheels 12 and 13 respectively. The clutch 13 is connected with sprocket 6 on the car truck by a sprocket chain 14 to propel the car C. A counter-shaft 15 is mounted on the platform 2 of the car in bearings 16 and carries at one end a sprocket 17 connected by a sprocket chain 18 with the drive sprocket 12 on the engine shaft.

The car E may be of any suitable type such as a gondola adapted to receive loose peat and to be connected to the car C by a coupler 19. The frame F is formed of laterally extending channels 20, 21 and 22 joined by the cross-frames 23, 24 and 25 formed of channel iron or other suitable material. The outer end of the frame F is supported on the track G by two wheels 26 which are formed with double flanges 27 and a wide tread 28 adapted to irregularities in the gage of the track. The wheels 26 are mounted on stud shafts 29 fixed in the rack bar 30 which is carried in a vertical position in a guide 31 attached to the cross frame 25 by bolts 32. A shaft 33 is carried in brackets 34 connected with the frame F by bolts 35. On this shaft are fixed pinions 36 meshing with the teeth 37 of the rack 30 and adapted to raise or lower the frame F upon the wheels 26 by the rotation of the shaft 33. At the forward end of the shaft 33 is fixed a beveled gear 38 meshing with the similar gear 39 on the shaft 40 which is journaled on brackets 41 on the channel 20. On the platform 2 of the car C is fixed a bracket 42 which carries at its top a box 43 pivoted to rotate transversely of the car C and in which is journaled a wheel shaft 44 carrying a hand wheel 45 at its upper end and connecting with the shaft 40 by means of a knuckle joint 46. The operation of the hand wheel 45 and the connected shaftings 44, 40 and 33 serves to raise or lower the outer end of the frame upon the wheels 26.

The inner end of the frame F adjacent to the car C is carried by rack bars 47 which are connected with the cross-frame 23 by yokes 48 attached thereto by cap bolts 49. The rack bars 47 are pivoted in yokes 48 upon pintles 50 and extend upward through guides 51 which are formed integral with bracket pieces 52 and attached to the side of the platform 2 by bolts 53. In the brackets 52 is journaled a shaft 54 extending the entire length of the car. On this shaft are fixed pinions 55 meshing with the teeth of the rack bars 47 to raise and lower the inner end of the frame F. On the shaft 54 is mounted a worm wheel 56 operated by a vertical worm 57. This worm is mounted on a shaft 58 which is journaled in a bracket 59 attached to the platform 2 and carries at its top a hand wheel 60 by which the worm 57 may be operated to raise and lower the inner end of the frame F.

In the cross frames 25 and 24 is journaled a shaft 61 on which are mounted agitators 62 to form a suitable pulverizer H. The agitators may be of any desired form adapted to finely disintegrate the soil in which they are operated. As shown they have the form of round bars extending transversely at intervals along the shaft. A sprocket wheel 63 is mounted on shaft 61 to drive it. In front of the pulverizer H is journaled a brush J formed of any suitable brush material fixed upon the shaft 64 mounted in the cross frames 24 and 25. A pan 65 having a back portion 66 extends parallel to the brush J and is attached to the frames 21, 24 and 25. The back edge of the pan 65 is bent downward to form a scoop 67 adjacent to the periphery of the brush J to receive material swept forward by the brush.

The conveyer K which coöperates with the brush J consists of a transverse belt 68 operating in the pan 65 and formed of two chains 69 made up of links 70 and adapted to operate over sprocket wheel 72 mounted upon the frame F by means of shafts 73 journaled in suitable bearings 74 and 75 (see Figs. 1 and 2) connected with the frames 20 and 21. At the inner end of the pan 65 similar sprocket wheels 76 are mounted on a shaft 77 journaled in bearings 78 on the frames 20 and 21. Bracket supports 79 and 80 are mounted on the cross frames 23 and 24 at the front of the frame F and carry the drive shaft 81 journaled at their top. A shaft 82 is mounted in the bearing 83 upon the bracket 80 and is operated by a pair of beveled gears 84, one on the shaft 82 and the other on the drive shaft 81. Sprocket wheels 85 carried by the shaft 82 drive the conveyer K, carrying it over the sprockets 71 and 72, along the bottom of the pan 65, and up the inclined end 86 of the pan. From this point it is carried directly upward over loose sprockets 87 (see Fig. 3) mounted on the bracket 80 (see Fig. 1) and over the drive sprockets 85 (see Figs. 1 and 2). The conveyer chains 69 are provided with scrapers 88 which lie transversely of the pan 65 extending beyond the rearmost chains 69. The scrapers 88 are adapted by the movement of the chain toward the car C to carry the material received on the pan toward the car. In Fig. 9 I have illustrated a form of scraper which may be used instead of the flat strips shown in Fig. 8 and consisting of a brush 89 mounted on a narrow strip 90 attached to the chain 69.

From the inner extremity 86 of the pan 65 the material is dropped onto the lower end of the elevator L which extends parallel with the body of the car C to a point where it empties into an inclined spout 91 by which it is conveyed into the car E. The elevator L is formed with side pieces 92 fixed to the frame 20 and supported on the frame 22 by the framework 93. The elevator has a bottom part 94 forming with the sides 92, a trough in which operates a conveyer formed of chains 95 and cross pieces 96 similar to the chains and cross pieces of the elevator K as illustrated in Fig. 8. The conveyer passes over loose sprockets 187 at the upper end of the elevator and returns below the bottom 94 and around drive sprocket 97 at the lower end of the elevator. The drive sprockets 97 are carried by a shaft 98 which is driven by the sprocket 99 and chain 100 from the sprocket 101 on the drive shaft 81.

A sprocket 102 mounted on the drive shaft 81, by means of a chain 103 operates a counter-shaft 104 journaled on the cross frames 23 and 24. The shaft 104 carries a gear 105 which meshes with a gear 106 on the shaft 64 of the brush J to operate the brush and also carries a sprocket 120 driving a chain 107 which connects with the sprocket 63 on the shaft of the pulverizer H. By this means the drive shaft 81 operates the conveyers K and L and drives the pulverizer and brush J, the transmitting parts being so arranged that the pulverizer is rotated to advance the frame F while the brush J is rotated in the opposite direction sweeping the loose material from the ground forward into the pan 65.

The outer extremity of the frame F is supported from the forward end of the car C by a diagonal tie rod 108 attached to the forward end of the frame 23 and to the frame 20, and made adjustable by a turnbuckle 109.

The counter shaft 15 on the platform 2 is connected with the drive shaft 81 by means of a double-knuckle joint having two parts 110 and 111, between which is interposed a sleeve 112 attached to the part 110, in which slides the shaft 113 on a feather-key 114. This connection permits the vertical adjustment of the frame F upon the car C with the resulting lengthening and shortening of the knuckle connection.

The pulverizer H is adjusted vertically at each end on the frame F by means of a block 115 carrying the shaft 61 and sliding in the guide groove 116 in the bracket 117 which is supported on the frame F, the adjustment being effected by a vertical adjusting screw 118 operating in the block 115.

In operating my machine the tracks D and G are laid on the surface of the ground which is to be excavated and suitably spaced apart. The pulverizer is adjusted below the brush J and the frame F being lowered by means of the hand wheels 45 and 60 to the proper elevation above the ground, the machine is driven along the tracks by means of the engine M operating the drive truck of the car C at the same time the engine operates the drive shaft 81 and the pulverizer, brush and conveyers connected therewith. In traveling over the ground the first time the material gathered by the collector will not be retained. The surface of the peat is however pulverized by the agitator H and may be allowed to dry for any desired period. After the peat is dried in its pulverized condition the machine is once more run along the rails with the brush J operating to the depth to which the material is loosened or pulverized. The pulverized material is swept forward by the brush onto the pans 65 where the conveyer K moves it laterally into the elevator L which conveys it to the car E, at the same time the pulverizer H operates on the cleared surface of the ground and pulverizes a new layer of material which is in turn allowed to dry. This process may be repeated within the limits of adjustment of the frame F by means of its rack bars. The engine M may at any time be disconnected from the car drive or from the pulverizing and collecting machinery by means of the respective clutches 11 and 10.

The term brush as used in this specification and the following claims is intended to include a series of paddles or scoops or other suitable means operating in a similar manner to secure the same result as the brush described.

In accordance with the patent statutes I have described the principles of operation of my invention together with the apparatus which I now consider to represent the best embodiment thereof but I desire to have it understood that the construction shown is only illustrative and that the invention can be carried out by other means and applied to uses other than those above set forth within the scope of the following claims.

Having described my invention, what I claim as new and desire to protect by Letters Patent is:—

1. A peat machine, comprising in combination, a support movable along the ground, a pulverizer on said support adapted to disintegrate the surface of the ground, a collector consisting of a rotary brush and a conveyer receiving material from said brush in connection with said support, and means mounted on said support for operating said pulverizer and collector.

2. A peat machine, comprising in combination, a supporting frame, a rotary pulverizer and a rotary brush journaled transversely thereon and means for rotating said pulverizer and brush in opposite directions whereby said pulverizer tends to advance the frame while operating and said brush sweeps material forward.

3. A peat machine, comprising, in combination, a frame, wheels supporting said frame, a rotary agitator journaled on said frame in contact with the ground to pulverize its surface and a rotary collector mounted in connection with said agitator to gather pulverized material from the ground.

4. A peat machine, comprising in combination, a supporting frame mounted on wheels, a rotary brush journaled on said frame transversely thereof and adapted to sweep pulverized peat from the surface of the ground, a tray coöperating with said brush to receive peat therefrom, and a conveyer operating on said tray to remove the peat therefrom and a pulverizer mounted on said frame and adapted to pulverize the ground surface cleared by said brush.

5. A peat machine, comprising in combination, a car adapted to be propelled along a track, a frame mounted on said car at the side thereof and supported at its outer end by wheels, said frame being vertically adjustable on said wheels and car, a conveyer mounted on said frame and adapted to convey loose material to a receptacle on said car track, a brush journaled on said frame and adapted to deliver material to said conveyer and a pulverizer revolving on said frame to pulverize material behind said brush.

6. In a peat machine, a traveling frame mounted on wheels, a rotary brush mounted transversely of said frame, a pulverizer mounted transversely of said frame, said frame being vertically adjustable on said wheels and said pulverizer being vertically adjustable on said frame, and means for operating said brush and pulverizer to sweep loose material from the ground and subsequently repulverize the cleared surface.

In testimony whereof, I have signed my name to this specification, in the presence of two subscribing witnesses.

ANDREW S. CAIRNCROSS.

Witnesses:
H. L. FISCHER,
M. C. ADAMS.